April 26, 1927.
H. H. DREW
TABLE SLIDE
Filed Nov. 10, 1924
1,626,189
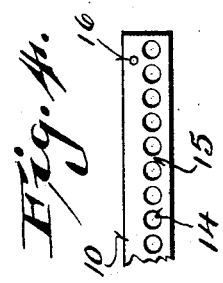
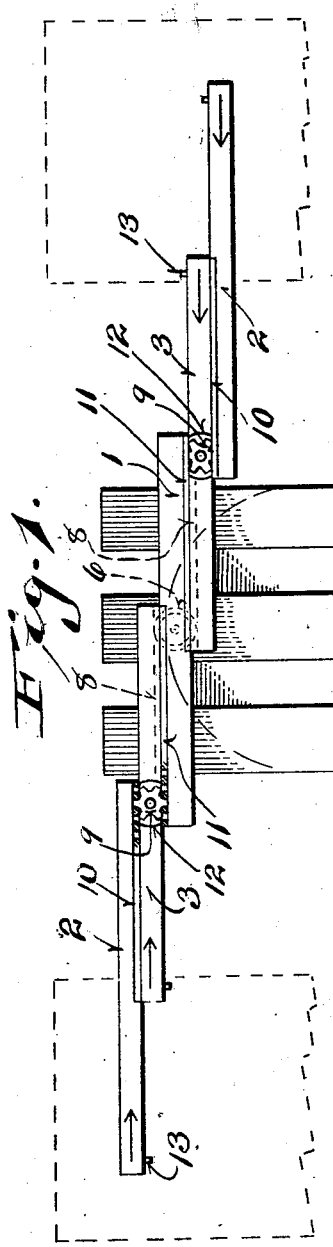
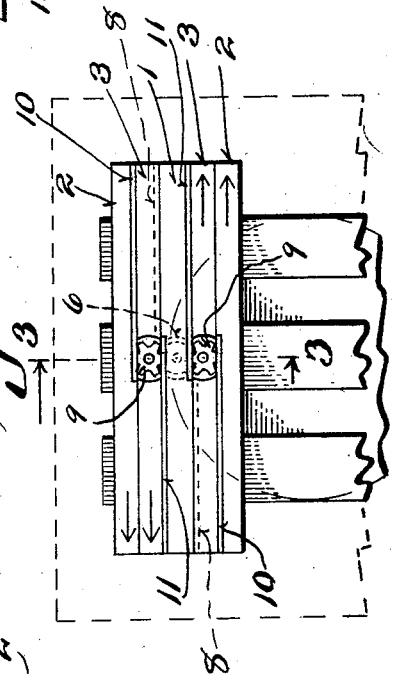
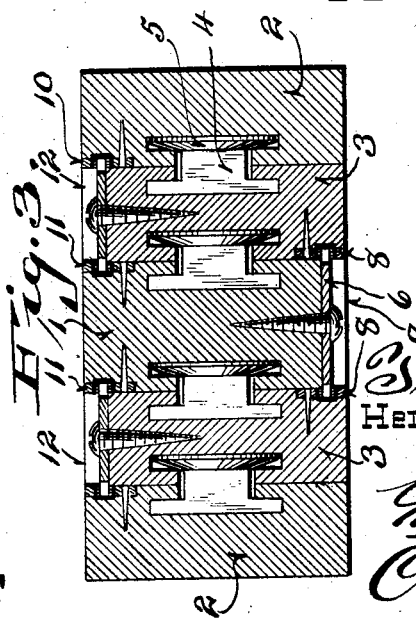
Inventor
Herbert H. Drew Patented Apr. 26, 1927.

1,626,189

UNITED STATES PATENT OFFICE.

HERBERT H. DREW, OF WATERTOWN, WISCONSIN, ASSIGNOR TO WATERTOWN TABLE-SLIDE CO., OF WATERTOWN, WISCONSIN.

TABLE SLIDE.

Application filed November 10, 1924. Serial No. 748,957.

This invention relates to extension table slides.

Table slides having three slide elements have been constructed heretofore to provide for the simultaneous motion of the slide members, but where it is necessary to provide greater extension or a greater number of slide members, this construction has not been satisfactory. Attempts made to provide more than three slide members involved the use of latches and other devices for temporarily locking pairs of slides together. This expedient necessitated careful attention on the part of the operator and required additional mechanism which rendered the device on the one hand unattractive to a prospective purchaser and on the other hand expensive to manufacture.

This invention is designed to overcome the above noted defects, and objects of such invention are to provide an extension table slide having more than three slide elements and to so relate the elements that motion of of one will cause simultaneous motion of all of the elements and to secure this desirable result without employing latches or other expensive and undesirable mechanism, but to provide such mechanism as will relieve the operator of all thought or effort or special manipulations when extension is desired.

Further objects are to provide an extension slide construction in which the surfaces are flat and free from projections, which is highly desirable in slide construction, in which rack and pinions are employed in a novel and effective manner to secure the simultaneous relative motion of all of the members, and in which the pinions are held against lateral disengagement from the racks although wear may occur between the slide members.

Further objects are to provide an extension slide construction in which the retaining screws are so positioned, due to the construction of rack and pinion, that they may enter a material and relatively large body of the wood forming the slide members, and are not positioned in a weakened easily split portion as has heretofore been the practice.

Further objects are to provide an extension table slide which is of light construction although strong and durable, and which may be cheaply and readily produced.

An embodiment of the invention is shown in the accompanying drawing, in which:—

Figure 1 is a plan view of one of the slides showing it extended.

Figure 2 is a similar view showing the slide contracted.

Figure 3 is an enlarged transverse sectional view on the line 3—3 of Figure 2.

Figure 4 is a view of one of the racks removed from other portions of the apparatus.

Referring to the drawings, it will be seen that a central slide member 1 is rigidly secured to the stationary portion or pedestal portion of the table. A pair of outer slide members 2 are provided and a pair of intermediate slide members 3 are positioned between the outer slide members 2 and the center slide members 1. These several slide members may be connected in any suitable manner as by means of the blocks 4 and rollers 5 so as to hold them in inner engaging relation and yet permit their free sliding.

It is to be noted at this point that the invention contemplates the use of a central fixed slide member with two associated pairs of slide elements, each pair of slide elements having an outer slide member 2 and an intermediate slide member 3. These groups of slide members are connected by means of a pinion 6 set into a recess 7 in the central slide member 1 (see Figure 3) and a pair of racks 8 carried by the intermediate slide members 3. Thus motion of either group of slide members will cause simultaneous motion in the opposite direction of the other group. The pinion and racks, it will be noted are preferably positioned adjacent the lower side of the central and intermediate members although, obviously, they might be positioned on the upper side with similar reversal of mechanism hereinafter to be described. Each group comprises, as stated, an outer slide member 2, and an intermediate slide member 3. The intermediate slide member 3 in each case is provided with a pinion 9 which meshes with a rack 10 carried by the outer slide member 2 and with a rack 11 carried by the central slide member 1.

It will be noted from Figure 3 that the racks 10 and 11 and the pinions 9 are positioned adjacent the upper face of the slide members, so as to avoid interference with the rack and pinion construction carried adjacent the lower faces of the central and intermediate members, as previously described. It is to be noted further that the pinions 9 are each set in recesses 12 formed in the intermediate members 3 so as to prevent the formation of projecting obstructions upon the faces of the slide members.

Suitable stops, such as the pins 13, may be provided in the usual manner for limiting the inward motion of the slide members.

The racks are of identical construction and one of the racks, for instance the rack 10 has been shown in detail in Figure 4. It will be noted from this figure that the rack consists of a metal strip having a plurality of punched holes 14 which provide intermediate bars 15 which act as the teeth of the rack. By this construction a continuous upper and lower marginal edge is provided for each of the racks and disengagement of the pinions laterally from the racks is wholly prevented even when wear has occurred between the individual slide members.

These racks are provided with smaller apertures 16 adapted to receive attaching screws, as shown in Figure 3, and such racks are preferably inset in the corresponding vertical faces of the slide members. This construction provides a secure backing for each of the racks and permits the rack being formed of thin cheap material as the bars 15 are reenforced by the continuous marginal portions of the racks and as the racks themselves are adequately backed by the slide members.

It will be seen that an extension slide construction has been provided which permits the use of a large number of slide members in excess of that heretofore successfully employed, and which is provided with extremely simple and durable mechanism insuring simultaneous motion of all of the members.

It will further be seen that a very cheap and easily produced construction has been provided although the construction is eminently effective in operation, and it is to be noted further that no projections or obstructions are provided on the upper and lower faces of the slides.

Although the invention has been described in considerable detail, it is to be understood that the invention may be variously embodied and is, therefore, to be limited only as claimed.

I claim:

1. An extension table slide comprising a central member having racks secured to its vertical faces adjacent one side and having a pinion secured to its other side, a pair of outer members each having a rack secured to a vertical face adjacent one side, and a pair of intermediate members located between said outer members and said central member and having pinions meshing with the racks on said outer and central members and having racks meshing with the pinion carried by said central member.

2. An extension table slide comprising a central relatively stationary member, a pinion secured to the under side of said member with its axis passing through such member, a pair of intermediate members each having racks on a face towards said central member and meshing with said pinion, a pair of outer members associated with said intermediate members, said central member having racks on opposite sides thereof and adjacent the upper side of said central member, said outer members having racks facing the second mentioned racks, and pinions carried by said intermediate members and meshing with said second and third mentioned racks and located on the upper side of said intermediate member.

In testimony that I claim the foregoing I have hereunto set my hand at Watertown, in the county of Jefferson and State of Wisconsin.

HERBERT H. DREW.